United States Patent
Gruber et al.

(10) Patent No.: US 9,410,476 B2
(45) Date of Patent: Aug. 9, 2016

(54) INTERNAL COMBUSTION ENGINE-REFORMER INSTALLATION

(71) Applicant: GE Jenbacher GmbH & Co OG, Jenbach (AT)

(72) Inventors: Friedrich Gruber, Hippach (AT); Gunther Wall, Bad Haring (AT); Michael Url, Neufahrn (AT); Lukas Vogl, Innsbruck (AT)

(73) Assignee: GE JENBACHER GmbH & CO OG, Jenbach (AT)

( * ) Notice: Subject to any disclaimer, the term of this patent is extended or adjusted under 35 U.S.C. 154(b) by 0 days.

(21) Appl. No.: 14/059,930

(22) Filed: Oct. 22, 2013

(65) Prior Publication Data

US 2014/0109853 A1 Apr. 24, 2014

(30) Foreign Application Priority Data

Oct. 24, 2012 (AT) ................. A 1143/2012

(51) Int. Cl.
*F02B 51/00* (2006.01)
*F02M 25/12* (2006.01)
(Continued)

(52) U.S. Cl.
CPC ............ *F02B 51/00* (2013.01); *F02D 19/0628* (2013.01); *F02D 19/0671* (2013.01); *F02D 41/0025* (2013.01); *F02M 25/12* (2013.01); *F02D 41/0027* (2013.01); *Y02T 10/36* (2013.01)

(58) Field of Classification Search
CPC ........ F02B 51/00; F02M 25/12; F02M 25/10; F02M 21/0227; F02M 21/023; F02M 21/0239; F02M 21/25; F02M 21/0742; F02D 41/0025; F02D 41/0027; F02D 19/0671; F02D 21/00; F02D 21/02; F02D 21/04
USPC ................... 123/1 A, 575; 701/101, 103, 104
See application file for complete search history.

(56) References Cited

U.S. PATENT DOCUMENTS 4,131,086 A * 12/1978 Noguchi et al. .................. 123/3
6,508,209 B1 1/2003 Collier, Jr.
(Continued)

FOREIGN PATENT DOCUMENTS

CN 101332761 12/2008
JP 2009-97422 5/2009
(Continued)

OTHER PUBLICATIONS

Austrian Patent Office Search Report (ASR) issued Apr. 26, 2013 in Austrian Patent Application No. A 1143/2012.
(Continued)

*Primary Examiner* — Grant Moubry
(74) *Attorney, Agent, or Firm* — Wenderoth, Lind & Ponack, L.L.P.

(57) ABSTRACT

A method of operating an internal combustion engine-reformer installation having an internal combustion engine and a reformer, includes predetermining at least one parameter of the internal combustion engine, calculating a desired amount of fuel for the reformer on the basis of the at least one parameter, feeding the desired amount of fuel to the reformer, reforming fuel to give a synthesis gas in the reformer, and feeding the synthesis gas to the internal combustion engine. A synthesis gas pressure of the synthesis gas downstream of the reformer is measured, and the synthesis gas pressure is taken into consideration when calculating the desired amount of fuel.

7 Claims, 2 Drawing Sheets

(51) Int. Cl.
*F02D 41/00* (2006.01)
*F02D 19/06* (2006.01)

(56) References Cited

U.S. PATENT DOCUMENTS

| | | | |
|---|---|---|---|
| 7,021,048 B2* | 4/2006 | Taylor et al. | 60/295 |
| 7,028,644 B2 | 4/2006 | Cohn et al. | |
| 7,177,751 B2* | 2/2007 | Froloff et al. | 701/102 |
| 7,597,068 B2* | 10/2009 | Arai et al. | 123/3 |
| 8,396,644 B2* | 3/2013 | Kabashima et al. | 701/103 |
| 8,486,166 B2 | 7/2013 | Yahagi et al. | |
| 2003/0140622 A1 | 7/2003 | Taylor, III et al. | |
| 2004/0028964 A1 | 2/2004 | Smaling | |
| 2004/0035395 A1 | 2/2004 | Heywood et al. | |
| 2004/0050345 A1 | 3/2004 | Bauer | |
| 2007/0033929 A1 | 2/2007 | Telford et al. | |
| 2007/0113803 A1* | 5/2007 | Froloff et al. | 123/90.11 |
| 2009/0000575 A1 | 1/2009 | Shimada et al. | |
| 2010/0180838 A1* | 7/2010 | Lewis et al. | 123/3 |
| 2010/0268442 A1 | 10/2010 | Kabashima et al. | |

FOREIGN PATENT DOCUMENTS

| | | |
|---|---|---|
| JP | 2010-255442 | 11/2010 |
| WO | 2009/107454 | 9/2009 |

OTHER PUBLICATIONS

Unofficial English Translation of German Office Action issued in connection with corresponding DE Application No. 102013016741.8 on Mar. 9, 2015.

* cited by examiner

INTERNAL COMBUSTION ENGINE-REFORMER INSTALLATION

BACKGROUND OF THE INVENTION

The present invention concerns a method of operating an internal combustion engine-reformer installation having the features of a classifying portion, and such an internal combustion engine-reformer installation having the features of a classifying portion.

In the operation of an internal combustion engine—in particular a gas engine—it may be advantageous for at least a part of the fuel to be reformed into a synthesis gas prior to combustion. That means that endothermic and exothermic reactions take place in a so-called reformer, in which a hydrogen-bearing synthesis gas is obtained from the fuel. The addition of that hydrogen-bearing gas to the combustion mixture makes it possible, for example, to improve the ignition characteristics or to reduce the production of unwanted emissions.

Installations in which both an internal combustion engine and also a reformer are integrated are known in the state of the art, such as the installation in U.S. Pat. No. 6,508,209 B1.

Admittedly, the regulation of a reformer on the basis of a predetermined ratio of steam to carbon or oxygen to carbon is known. It will be noted, however, that these regulation concepts are designed for a production of synthesis gas, that is as constant as possible. They cannot satisfy the varying needs for synthesis gas of an internal combustion engine. A simple solution to that problem would be to maintain a buffer volume of synthesis gas or to produce synthesis gas to a relatively high extent and burn off the excess. Those solutions, however, are not appropriate in energy terms and considerably reduce the efficiency of the installation.

A concept for regulating an internal combustion engine-reformer installation was disclosed in US 2004/0050345 A1. In that case, the desired amount of fuel which is fed to the reformer is determined on the basis of the injection amount of the internal combustion engine.

A disadvantage in that respect is that upon a change in the operating point of the internal combustion engine, the amount of synthesis gas provided is not that which is required at the time but that which corresponds to the operating point prior to the change. In the case of changes in load which in practice occur frequently, the result of this is that significantly too much or too little synthesis gas is delivered to the internal combustion engine.

SUMMARY OF THE INVENTION

The object of the invention is to provide an open or closed loop control method for an internal combustion engine-reformer installation, in which precisely the amount of synthesis gas that is required at the time by the internal combustion engine can be afforded by the reformer. In addition, the invention seeks to provide an internal combustion engine-reformer installation which allows such a method to be carried out.

That object is attained by a method described below and by an internal combustion engine-reformer installation described below.

That is effected in that the pressure of the synthesis gas is measured in the synthesis gas line which supplies the synthesis gas from the reformer to the internal combustion engine, and that synthesis gas pressure is then used to determine the desired amount of fuel which is fed to the reformer. In other words, the pressure in the synthesis gas line is constantly held at a level acceptable to the internal combustion engine.

In addition, various parameters of the internal combustion engine can be used to calculate the desired amount of fuel. In particular, a charge pressure or a power output of the internal combustion engine are suitable for that purpose as they are often already measured in any case in the course of control of the internal combustion engine.

For particularly accurate regulation or control, a reformer transfer function can be used to determine the desired amount of fuel. By means of such a reformer transfer function, it is possible to calculate both the composition and also the amount of synthesis gas produced by the reformer. The reformer transfer function can be based on the volume flows and the chemical compositions of the substance flows passing into the reformer. In the simplest case, such a reformer transfer function can be generated by way of a direct measurement of the amount and composition of the synthesis gas produced by the reformer with different entry volume flows and possibly different temperatures.

To keep the chemical conditions in the reformer as optimum as possible, desired ratios of steam to carbon and of oxygen to carbon can be predetermined for the reformer. On the basis of the desired conditions, a desired amount of air and/or a desired amount of exhaust gas and/or a desired amount of steam are determined, and the desired amount of air and/or the desired amount of exhaust gas from the internal combustion engine and/or the desired amount of steam are fed to the reformer.

In this embodiment, a reformer transfer function can be used to determine the desired amount of air and/or the desired amount of exhaust gas and/or the desired amount of steam, whereby the ratios in the reformer can be particularly accurately controlled.

In order, moreover, to be able to determine the composition of the synthesis gas downstream of the reformer with a high level of accuracy, an entry temperature of a substance flow into the reformer and/or an exit temperature of a substance flow out of the reformer can be measured. The entry temperature and/or the exit temperature can be used in determining the desired amount of fuel and/or the desired amount of air and/or the desired amount of exhaust gas and/or the desired amount of steam. In particular, the reformer transfer function can depend on the measured temperatures.

BRIEF DESCRIPTION OF THE DRAWINGS

Further advantages and details will be apparent from the Figures and the specific description relating thereto. In the Figures.

DETAILED DESCRIPTION OF THE INVENTION

Figure 1:
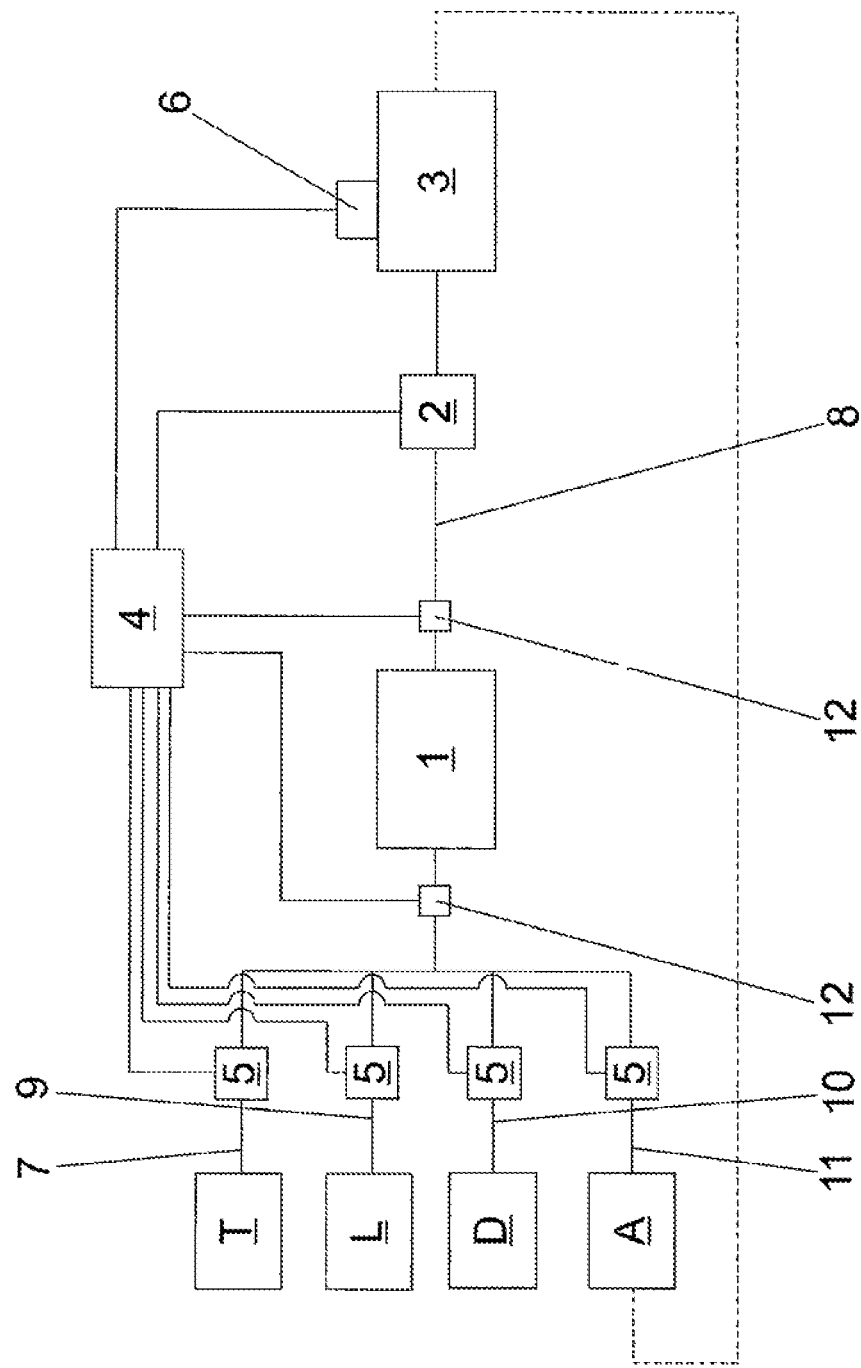
FIG. 1 shows the circuitry of an internal combustion engine-reformer installation according to the invention.

In FIG. 1 it is possible firstly to see the reformer 1, the internal combustion engine 3, and the synthesis gas line 8. The reformer is supplied by a fuel line 7 with fuel from a fuel reservoir T, by an air feed line 9 with air L, and by a steam feed line 10 with steam D. In addition, exhaust gas A of the internal combustion engine 3 is recycled into the reformer 1 by the exhaust gas line 11. The control valves 5 which allow the feed of fuel, air, steam and exhaust gas in open or closed loop controlled amounts are arranged in the respective lines and are respectively connected to the open or closed loop control device 4. In the present embodiment, those control valves 5 are in the form of volume flow regulating valves. That means that they also include a volume flow measuring device as well as a closed loop control circuit for closed loop controlling the volume flows to the desired values which are predetermined by the closed loop control device 4. See in that respect FIG. 2.

Arranged in the synthesis gas line 8 is the pressure measuring device 2 which is connected to the closed loop control device 4. Based on the synthesis gas pressure $p_{act}$ measured by the pressure measuring device 2, the desired amount of fuel $Q_{ref}$ as well as the desired amount of air, the desired amount of exhaust gas, and the desired amount of steam can be calculated by the closed loop control device 4.

In this embodiment, the various substance flows are brought together prior to the feed to the transformer 1. As a result, it is possible to measure the temperature of the flow into the reformer 1 by a temperature measuring device 12. Likewise, a temperature measuring device 12 for measuring the synthesis gas temperature is arranged in the synthesis gas line 8.

Arranged at the engine 3 is a measuring device 6 whereby the charge pressure $P_2'$ and/or the power output P of the engine 3 can be measured.

Calculation of the desired amount of fuel $Q_{ref}$ can be effected in various ways.

Figure 2A:
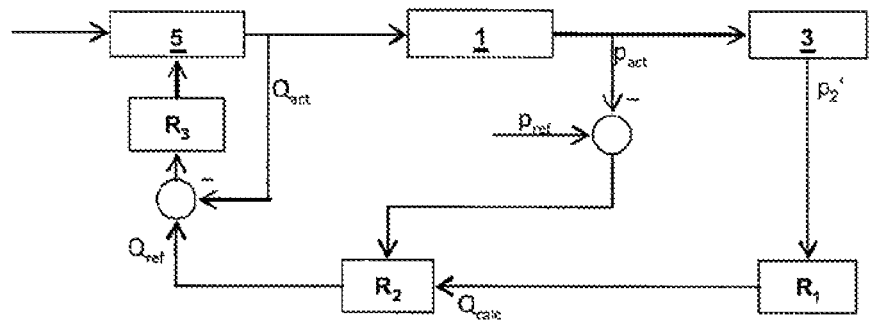
FIGS. 2A-2C show various configurations for closed loop control concepts for determining the desired amount of fuel.

FIG. 2a shows the control valve 5, by way of which fuel is fed to the reformer 1, and the internal combustion engine 3. Measurement of the charge pressure $p'_2$ and further parameters of the internal combustion engine is effected at the internal combustion engine 3. The amount of fuel $Q_{calc}$ required by the internal combustion engine is calculated in the closed loop control circuit $R_1$. Those calculations are known per se in the state of the art. As an example, we give the following formula:

$$Q_{calc} = \frac{V_{cyl}}{1+\lambda \cdot l_{min}} \cdot N_{cyl} \cdot \eta_{vol} \cdot \frac{p'_2}{T'_2} \cdot \frac{T_n}{p_n} \cdot \frac{n}{2 \cdot 60}$$

In that formula $V_{cyl}$, denotes the volume per cylinder of the internal combustion engine, $N_{cyl}$, denotes the number of cylinders, $I_{min}$ denotes the minimum air volume, $\eta_{vol}$ denotes the volumetric efficiency, n denotes the instantaneous revolutions per minute of the internal combustion engine, $T'_2$ and $P'_2$ denote the temperature and the pressure respectively of the combustion mixture, and $\lambda$ denotes the ratio of air to fuel relative to the stoichiometric ratio. In addition, $T_n$ and $P_n$ denote the standard temperature and standard pressure (that is to say $T_n$=273.15 K and $P_n$=1.01325 bar). Similar equations based on the power output P of the internal combustion engine or on the charge pressure $p'_2$ and the power output P of the internal combustion engine are known per se to a person skilled in the art.

The pressure $p_{act}$ of the synthesis gas in the synthesis gas line 8 downstream of reformer 1 measured by the pressure measuring device 2 is compared to a reference pressure $p_{ref}$. On the basis of the result of that comparison and the amount $Q_{cal}$ calculated in the closed loop control circuit $R_1$, the desired amount of fuel $Q_{ref}$ is calculated in the closed loop control circuit $R_2$. In that respect, for example, the following equation can be used:

$$Q_{ref}=(p_{ref}-p_{act})\cdot\gamma\cdot Q_{calc}$$

Both the reference pressure $p_{ref}$ and also the proportionality factor $\gamma$ are to be empirically determined in the course of calibration of the installation. It is also possible to envisage more complex dependencies so that, for example, the proportionality factor $\gamma$ could include a time dependency or the like.

Finally, the currently prevailing fuel volume flow which is into the reformer is measured in the closed loop control circuit $R_3$ compared to the desired amount of fuel $Q_{ref}$, and the fuel volume flow is closed loop controlled by way of the valve 5.

Figure 2B:
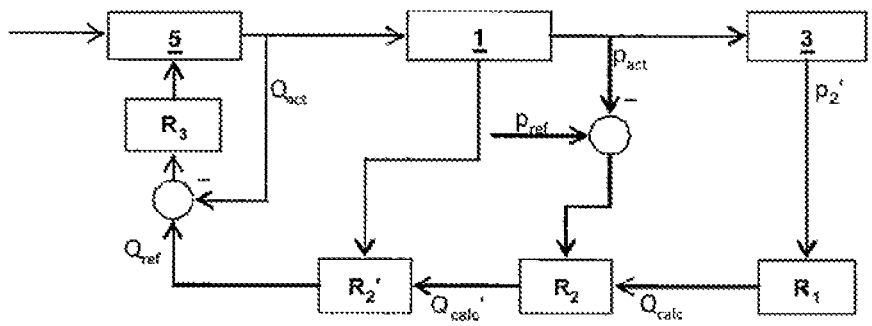
Figure 2C:
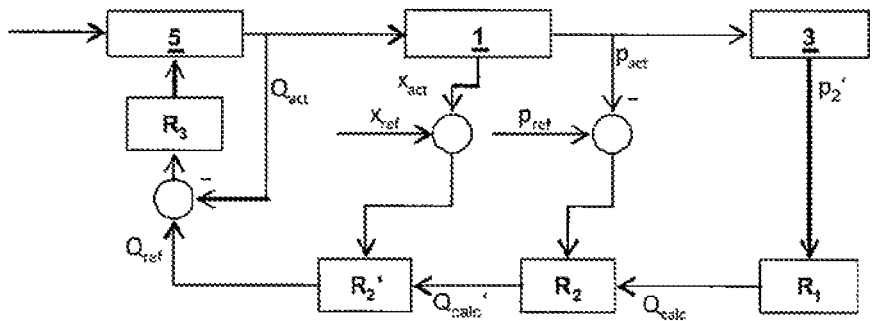

That closed loop control concept can be expanded by using, for example, a reformer transfer function. Examples of this are shown in FIGS. 2b and 2c. Provided there are additional closed loop control circuits $R_2'$ which precisely make use of that reformer transfer function. The following regulating law is employed in this embodiment:

$$Q_{ref}=(x_{ref}-x_{act})\cdot\gamma'\cdot Q_{calc}$$

In that equation, $\gamma'$ denotes a further proportionality factor, $Q'_{calc}$ denotes the result of the closed loop control circuit $R_2$, $x_{ref}$ denotes a desired value of a parameter for the composition of the synthesis gas, and $x_{act}$ denotes the evaluation result of the reformer transfer function. In this case, the reformer transfer function depends on the instantaneous substance flows into the reformer, the entry and exit temperatures of the reformer, and the desired ratios S/C and O/C (steam/carbon and oxygen/carbon).

In this embodiment, the reformer transfer function is generated by a direct measurement of the amount and composition of the synthesis gas produced by the reformer at different entry volume flows and different temperatures. It is, however, also possible to ascertain the reformer transfer function by means of a simulation.

The invention claimed is:

1. A method of operating an internal combustion engine-reformer installation having an internal combustion engine and a reformer, said method comprising:
   predetermining at least one parameter of the internal combustion engine;
   calculating a desired amount of fuel for the reformer based on the predetermined at least one parameter;
   feeding the desired amount of fuel to the reformer;
   reforming the desired amount of fuel in the reformer to produce a synthesis gas;
   feeding the synthesis gas to the internal combustion engine; and
   measuring a synthesis gas pressure of the synthesis gas downstream of the reformer;
   wherein said calculating the desired amount of fuel for the reformer is further based on the measured synthesis gas pressure, and said calculating is performed using a reformer transfer function.

2. The method as set forth in claim 1, wherein the at least one parameter includes a charge pressure.

3. The method as set forth in claim 1, wherein the at least one parameter includes an engine power output.

4. The method as set forth in claim 1, further comprising:
   measuring at least one of an entry temperature of a substance flow into the reformer and an exit temperature of a substance flow out of the reformer; and
   calculating at least one of the desired amount of fuel, a desired amount of air, a desired amount of exhaust gas, and a desired amount of steam based at least in part on the measured at least one of the entry temperature and the exit temperature.

5. The method as set forth in claim 1, wherein said measuring a synthesis gas pressure of the synthesis gas downstream of the reformer comprises measuring the synthesis gas pressure within a synthesis gas line supplying the synthesis gas from the reformer to the internal combustion engine.

6. A method of operating an internal combustion engine-reformer installation having an internal combustion engine and a reformer, said method comprising:

predetermining at least one parameter of the internal combustion engine;
calculating a desired amount of fuel for the reformer based on the predetermined at least one parameter;
feeding the desired amount of fuel to the reformer;
reforming the desired amount of fuel in the reformer to produce a synthesis gas;
feeding the synthesis gas to the internal combustion engine;
measuring a synthesis gas pressure of the synthesis gas downstream of the reformer;
wherein said calculating the desired amount of fuel for the reformer is further based on the measured synthesis gas pressure;
predetermining desired ratios of steam to carbon and oxygen to carbon for the reformer;
calculating at least one of a desired amount of air, a desired amount of exhaust gas, and a desired amount of steam based on the predetermined desired ratios of steam to carbon and oxygen to carbon; and
feeding the calculated at least one of the desired amount of air, the desired amount of exhaust gas, and the desired amount of steam to the reformer.

7. The method as set forth in claim 6, wherein said calculating the at least one of the desired amount of air, the desired amount of exhaust gas, and the desired amount of steam is performed using a reformer transfer function.

\* \* \* \* \*